(12) United States Patent
Campbell, Jr. et al.

(10) Patent No.: US 12,378,154 B1
(45) Date of Patent: *Aug. 5, 2025

(54) CERAMIC ADDITIVE FORMULATION AND METHOD OF MAKING

(71) Applicant: Microban Products Company, Huntersville, NC (US)

(72) Inventors: Alvin Lamar Campbell, Jr., Huntersville, NC (US); Nathan L. Fields, Concord, NC (US)

(73) Assignee: MICROBAN PRODUCTS COMPANY, Huntersville, NC (US)

( * ) Notice: Subject to any disclaimer, the term of this patent is extended or adjusted under 35 U.S.C. 154(b) by 107 days.

This patent is subject to a terminal disclaimer.

(21) Appl. No.: 18/369,348

(22) Filed: Sep. 18, 2023

Related U.S. Application Data

(60) Continuation of application No. 17/124,104, filed on Dec. 16, 2020, now Pat. No. 11,767,256, which is a division of application No. 15/064,781, filed on Mar. 9, 2016, now Pat. No. 10,899,657.

(51) Int. Cl.
 *C03C 8/18* (2006.01)
 *C03C 8/02* (2006.01)
 *C03C 8/04* (2006.01)

(52) U.S. Cl.
 CPC ............... *C03C 8/18* (2013.01); *C03C 8/02* (2013.01); *C03C 8/04* (2013.01); *C03C 2204/02* (2013.01); *C03C 2209/00* (2013.01)

(58) Field of Classification Search
 CPC .... C03C 8/00; C03C 8/02; C03C 8/04; C03C 8/18; C03C 8/20; C03C 8/22
 See application file for complete search history.

(56) References Cited

U.S. PATENT DOCUMENTS

| | | | |
|---|---|---|---|
| 9,434,638 B2 * | 9/2016 | Campbell, Jr. | ........ A01N 59/02 |
| 9,446,980 B2 * | 9/2016 | Campbell, Jr. | ........ A61K 33/38 |
| 9,446,981 B2 * | 9/2016 | Campbell, Jr. | ........... C03C 8/20 |
| 9,974,310 B2 * | 5/2018 | Campbell, Jr. | .......... C09D 5/14 |
| 10,299,483 B2 * | 5/2019 | Campbell, Jr. | ........... C03C 8/04 |
| 10,899,657 B1 * | 1/2021 | Campbell, Jr. | ......... C03C 3/122 |
| 11,767,256 B1 * | 9/2023 | Campbell, Jr. | ......... C03C 3/122 |
| | | | 424/641 |

FOREIGN PATENT DOCUMENTS

WO   WO-2008103621 A1 *   8/2008   ............. A01N 25/08

* cited by examiner

*Primary Examiner* — Elizabeth A. Bolden
(74) *Attorney, Agent, or Firm* — James A. Smith; Shumaker, Loop & Kendrick, LLP

(57) ABSTRACT

A method of making a ceramic glaze additive formulation having an antimicrobial property for use with a ceramic article is provided. The method comprises fritting an antimicrobial formulation in a flux frit, providing a silver carrier in a glass matrix, combining the flux frit and the silver carrier in the glass matrix to form the ceramic glaze additive formulation, wherein the silver carrier is combined at an addition rate of at least 2 weight %, based on a dry weight basis of the ceramic glaze formulation. The flux frit is present in the ceramic glaze additive formulation in a range of 94 weight % to 99.5 weight %, based on a dry weight basis of the ceramic glaze additive formulation. A ceramic glaze additive formulation and a ceramic glazed article comprising a ceramic glaze additive formulation are also provided.

13 Claims, No Drawings

CERAMIC ADDITIVE FORMULATION AND METHOD OF MAKING

CROSS-REFERENCE TO RELATED APPLICATION

This application is a continuation application claiming priority from U.S. divisional application Ser. No. 17/124,104, filed Dec. 16, 2020, claiming priority from U.S. patent application Ser. No. 15/064,781, filed on Mar. 9, 2016, now U.S. Pat. No. 10,899,657 in the United States Patent and Trademark Office. The disclosure of which is incorporated herein by reference in its entirety.

FIELD OF THE INVENTION

The present invention relates generally to ceramic glazes, more particularly to a ceramic glaze additive formulation, a method of making the ceramic glaze additive formulation, and ceramic glazed articles.

BACKGROUND OF THE INVENTION

There is an increasing desire to have ceramic products have antimicrobial protection. For example, there is the desire for both household and commercial purposes for such ceramic products to be free of germs and bacteria.

Although consumers want such ceramic products to have this functional feature, consumers also do not want to sacrifice the appearance of such ceramic products.

Wall tile, especially glossy wall tile, presents a particular challenge. Consumers want the glossy wall tile to be shiny and smooth yet have antimicrobial protection. Wall tile is particularly difficult to manufacture with antimicrobial properties. Production of wall tile typically has a fast cycle time of approximately twenty-five to thirty minutes. Wall tile goes from being at ambient temperature to up to 2150 F to 2200 F and then back down to 500 F to 600 F.

If there are oxides in the wall tile, then there are noticeable imperfections when the tiles come out. The presence of bismuth can produce golf-ball-like dimples on the surface of the tile. This is primarily because bismuth has a lower viscosity and melts at a lower temperature than the other materials so that all the materials in the glaze may not go into solution at the same time.

Thus, there is a need for a solution to overcome this problem for this end use application.

SUMMARY OF THE INVENTION

The present invention relates to a ceramic glaze additive formulation, a method of making the ceramic glaze additive formulation, and a ceramic glazed article.

A method of making a ceramic glaze additive formulation having an antimicrobial property for use with a ceramic article is provided. The method comprises fritting an antimicrobial formulation in a flux frit; providing a silver carrier in a glass matrix; combining the flux frit and the silver carrier in the glass matrix to form the ceramic glaze additive formulation, wherein the silver carrier is combined at an addition rate of at least 2 weight %, based on a dry weight basis of the ceramic glaze formulation. The flux frit is present in the ceramic glaze additive formulation in a range of 94 weight % to 99.5 weight %, based on a dry weight basis of the ceramic glaze additive formulation.

A ceramic glaze additive formulation is provided. The ceramic glaze additive formulation comprises a fritted antimicrobial composition comprising an antimicrobial selected from the group consisting of bismuth oxide, zinc oxide, and a combination thereof; and a silver carrier in a glass matrix.

A ceramic glazed article is provided comprising an article having a ceramic glaze additive formulation applied thereon. The ceramic glaze additive formulation is comprised of a fritted antimicrobial composition comprising an antimicrobial selected from the group consisting of bismuth oxide, zinc oxide, and a combination thereof; and a silver carrier in a glass matrix.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DESCRIPTION OF THE PREFERRED EMBODIMENTS

The following description of the embodiments of the present invention is merely exemplary in nature and is in no way intended to limit the invention, its application, or uses. The present invention has broad potential application and utility, which is contemplated to be adaptable across a wide range of industries. The following description is provided herein solely by way of example for purposes of providing an enabling disclosure of the invention, but does not limit the scope or substance of the invention.

As used herein, the terms "microbe" or "microbial" should be interpreted to refer to any of the microscopic organisms studied by microbiologists or found in the use environment of a ceramic article or ceramic-glazed article. Such organisms include, but are not limited to, bacteria and fungi as well as other single-celled organisms such as mold, mildew and algae. Viral particles and other infectious agents are also included in the term microbe.

The term "antimicrobial" includes biostatic activity, i.e., where the proliferation of microbiological species is reduced or eliminated, and true biocidal activity where microbiological species are killed. For ease of discussion, this detailed description may make reference to bacteria and antibacterial agents. This method of presentation should not be interpreted as limiting the scope of the invention in any way. As well, "antimicrobial" and like terms should be interpreted as encompassing both microbe-killing as well as microbiostatic activities. That is, it herein is considered efficacious if an antimicrobial composition reduces the number of microbes on a substrate or it the composition retards the normal rate of microbial growth.

For ease of discussion, this description uses the terms microbes and antimicrobial to denote a broad spectrum activity (e.g. against bacteria and fungi). When speaking of efficacy against a particular microorganism or taxonomic rank, the more focused term will be used (e.g. antifungal to denote efficacy against fungal growth in particular).

Using the above example, it should be understood that efficacy against fungi does not in any way preclude the possibility that the same antimicrobial composition demonstrates efficacy against another class.

For example, discussion of the strong bacterial efficacy demonstrated by a disclosed embodiment should not be read to exclude the embodiment from also demonstrating antifungal activity. This method of presentation should not be interpreted as limiting the scope of the invention in any way.

Glazes are generally made from powdered glass combined with colored oxides of such elements as cobalt, chrome, manganese, or nickel. The powder mixture is suspended in water and applied to the ceramic surface by spraying, brushing, dipping, or other known application methods.

The suspension, or slip, in which the glaze is applied to the ceramic surface must have particular properties to ensure that the glaze is easy to apply, does not run during glaze application, and adheres well both when wet and after firing. These slip properties are often obtained by adding a small amount of clay to the suspension and by controlling both the amount of water in the slip as well as the size of the powder particles. Organic surface-active agents (e.g. surfactants, detergents) also can be added to the slip to improve its properties. Colors in glazes are controlled by adding coloring agents to the glassy components of the glaze.

A ceramic production glaze formulation is a combination of ceramic materials that have been developed for production application to specific ceramic articles. A ceramic glaze additive formulation is a combination of antimicrobial components that are combined in a ceramic production glaze formulation to result in an antimicrobial ceramic production glaze formulation. The ceramic glaze additive formulation of the present invention comprises an antimicrobial selected from the group consisting of bismuth oxide ($Bi_2O_3$), zinc oxide (ZnO), and a combination thereof; and a silver carrier in a glass matrix.

The ceramic glaze additive formulation of the present invention is a fritted antimicrobial composition. As used herein, "fritting" means melting an antimicrobial agent(s) or constituent(s) into a glass, quenching the glass to freeze the amorphous condition, and then grinding to a desired particle size. The fritted antimicrobial composition is a more homogeneous composition and allows higher amounts of the components than is acceptable in the oxide form. Using a flux frit as the source of the antimicrobial components permits a much wider range of compositions. Fritting the composition creates an antimicrobial additive that is more easily combined with a base (untreated) glaze. The fritted material is also better tolerated in faster firing cycles with a reduction in surface defects due to varying firing cycles with a reduction in surface defects due to varying melting points and viscosities. The fritted material has fewer firing limitations because the dissociation of its components has already occurred during fritting.

In an aspect of the invention, bismuth oxide is present in the ceramic glaze additive formulation in a range of 89% to 96% by weight, preferably a range of 91% to 95% by weight, based upon the weight of the ceramic glaze additive formulation.

In an aspect of the invention, the zinc oxide is present in the ceramic glaze additive formulation in an amount of 2% to 10% by weight, preferably in an amount of 4% to 8% by weight, based upon the weight of the ceramic glaze additive formulation.

In another aspect of the invention, the silver carrier is present in the ceramic glaze additive formulation in a range of 0.1% to 6% by weight, preferably in a range of 1% to 3% by weight, based on the weight of the ceramic glaze additive formulation.

In accordance with the present invention, a method of making a ceramic glaze additive formulation having antimicrobial property for use with a ceramic article is provided.

Those skilled in the art recognize that the production process of ceramic products may vary from that which is presented below, and that the ceramic glazing process disclosed herein is adaptable to other substrates.

The method generally comprises fritting an antimicrobial formulation in a flux frit; providing a silver carrier in a glass matrix; and combining the flux frit and the silver carrier in the glass matrix to form a ceramic glaze additive formulation. In an aspect of the invention, the silver carrier is combined at an addition rate of at least 2 weight % based on the dry weight basis of the ceramic glaze additive formulation. The flux frit is present in the ceramic glaze additive formulation in a range of 94 weight % to 99.5 weight %, based on a dry weight basis of the ceramic glaze additive formulation.

There are numerous methods by which the silver carrier can be combined with the flux frit. The silver carrier can be mixed into the frit. It may require a larger amount of silver ions on the surface of the carrier. Another method by which the silver carrier can be added to the flux frit is by a treatment material such as a chemical bath. It is possible to preferentially put silver into a glass matrix such that it is on the surface of the carrier.

In an aspect of the method, the flux frit comprises an antimicrobial selected from the group consisting of zinc oxide, bismuth oxide, titanium oxide, tin oxide, silver compound, and a combination thereof. In a preferred aspect of the invention, the flux frit comprises an antimicrobial selected from the group consisting of bismuth oxide, zinc oxide, and a combination thereof. It was surprisingly found that there is a synergistic effect with zinc oxide and bismuth oxide in certain combinations when used in the method of the invention.

In another aspect of the method, the flux frit further comprises a glass former. The glass formers are typically glass constituents having no efficacious history.

In an aspect of the method, $Bi_2O_3$ is present in the flux frit in a range of 50% to 56% by weight, preferably in a range of 52% to 54% by weight, of the flux frit.

In an aspect of the method, the ZnO is present in the flux frit in a range of 1% to 10% by weight, preferably in a range of 2% to 4% by weight, of the flux frit.

In another aspect of the method, the glass former is present in the flux frit in a range of 38% to 49% by weight, preferably in a range of 42% to 46% by weight, of the flux frit.

In another embodiment of the present invention, a ceramic article is provided. The ceramic glazed article comprises a fritted antimicrobial composition comprising an antimicrobial selected from the group consisting of bismuth oxide, zinc oxide, and a combination thereof; and a silver carrier in a glass matrix.

In an aspect of the invention, the bismuth oxide is present in a range of 91% to 95% by weight of the ceramic glaze additive formulation, zinc oxide is present in an amount of 4% to 8% by weight of the ceramic glaze additive formulation, and the silver carrier is present in a range of 0.5% to 6% by weight of the ceramic glaze additive formulation.

In another aspect of the invention, the silver carrier is present in a range of 1% to 3% by weight of the ceramic glaze additive formulation.

The ceramic article of the present invention is any article having a ceramic glaze additive formulation applied thereon including, but not limited to, toilets, bidets, washbasins, towel rails, soap holders, toilet roll holders, water control fixtures (e.g., hot and cold water handles), and tiles.

The present invention surprisingly solves the need of making faster fired ceramic articles. The term "faster fired" refers to a shorter time required for the ceramic article to cycle through the kiln while maintaining the required properties and quality produced using the longer firing time. For example, the method reduces the firing time for various components of the glaze formulation. When subjected to heat, a ceramic formulation goes through various combinations of time and temperature (heat treatment) in a kiln to develop a vitreous or crystalline bond necessary to provide the properties associated with a ceramic material. This heat treatment (combination of time and temperature) is necessary to remove those materials which are given off at various points within the kiln. Examples of these are water of formation, chemical water, carbonates, phosphates, and all included organic materials. These are also known as "products of combustion" or "loss on ignition". Sufficient time must be provided for these materials to be expelled before the next time/temperature combination is reached. When the components of a glaze formulation are added as frit(s), all or part of the materials that would give off water, carbonates, etc., have been pre-fired to a glassy state, quenched, and ground to the proper size (frit), there is no reason to slow down the heat treatment. All of the reactions for the "products of combustion" have taken place during the fritting operation. Additionally, the method eliminates surface texture problems such as the hammered look that is seen on glossy glazes when an antimicrobial is added as a mixture of components.

In still yet another aspect of the method, it was surprisingly found that when a ceramic production glaze formulation, that is to be applied to a ceramic production substrate or article, comprises about 2 weight % to about 12 weight % on a dry weight basis of zinc oxide that it is possible to reduce the amount of zinc oxide in the antimicrobial addition. Thus, as a feature of the present invention, the amount of zinc oxide can range from 0 weight % to 10 weight % in the ceramic glaze additive formulation depending upon the amount of zinc oxide already present in the ceramic production ceramic glaze formulation. This is as a component of the ceramic glaze additive formulation that is then added to the ceramic production glaze formulation at 2% to 10% on a dry weight basis.

The fritting method of the present invention can be used to implement the different antimicrobial combinations into an untreated glaze or as an application of these materials in an aqueous solution or organic carrier onto the top surface of an unfired glaze.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. An glazed ceramic article comprising a ceramic glaze additive formulation applied thereon, wherein the ceramic glaze additive formulation comprises a fritted antimicrobial composition comprising an antimicrobial selected from the group consisting of bismuth oxide, zinc oxide and a combination thereof, and a silver carrier in a glass matrix, wherein bismuth oxide is present in the ceramic glaze additive formulation in a range of 89% to 96% by weight, based upon the weight of the ceramic glaze additive formulation.

2. The ceramic glaze additive formulation according to claim 1, wherein bismuth oxide is present in the ceramic glaze additive formulation in a range of 91% to 95% by weight, based upon the weight of the ceramic glaze additive formulation.

3. The ceramic glaze additive formulation according to claim 1, wherein zinc oxide is present in the ceramic glaze additive formulation in an amount of 2% to 10% by weight, based upon the weight of the ceramic glaze additive formulation.

4. The ceramic glaze additive formulation according to claim 3, wherein zinc oxide is present in the ceramic glaze additive formulation in an amount of 4% to 8% by weight, based upon the weight of the ceramic glaze additive formulation.

5. The ceramic glaze additive formulation according to claim 1, wherein the silver carrier is present in the ceramic glaze additive formulation in a range of 0.1% to 6% by weight, based on the weight of the ceramic glaze additive formulation.

6. The ceramic glaze additive formulation according to claim 5, wherein the silver carrier is present in the ceramic glaze additive formulation in a range of 1% to 3% by weight of the ceramic glaze additive formulation.

7. A method of treating a ceramic article comprising:
applying an antimicrobial composition on an outermost surface of the ceramic article, wherein the antimicrobial composition comprises an antimicrobial selected from the group consisting of bismuth oxide, zinc oxide and a combination thereof, and a silver carrier in a glass matrix, the antimicrobial composition having bismuth oxide is present in a range of 89% to 96% by weight, based upon the weight of the ceramic glaze additive formulation, and
firing the ceramic article having the antimicrobial composition applied thereon.

8. The method according to claim 7, wherein bismuth oxide is present in the ceramic glaze additive formulation in a range of 91% to 95% by weight, based upon the weight of the ceramic glaze additive formulation.

9. The method according to claim 7, wherein zinc oxide is present in the ceramic glaze additive formulation in an amount of 2% to 10% by weight, based upon the weight of the ceramic glaze additive formulation.

10. The method according to claim 7, wherein zinc oxide is present in the ceramic glaze additive formulation in an amount of 4% to 8% by weight, based upon the weight of the ceramic glaze additive formulation.

11. The method according to claim 7, wherein the silver carrier is present in the ceramic glaze additive formulation in a range of 0.1% to 6% by weight, based on the weight of the ceramic glaze additive formulation.

12. The method according to claim 7, wherein the silver carrier is present in the ceramic glaze additive formulation in a range of 1% to 3% by weight of the ceramic glaze additive formulation.

13. The method according to claim 7, wherein the ceramic article is selected from the group consisting of a toilet, bidet, washbasin, towel rail, soap holder, toilet roll holder, water control fixture, and tile.

* * * * *